Aug. 23, 1932. P. R. BRAGG 1,872,878
OIL GAUGE WIPER AND RECORD HOLDER
Filed May 1, 1931
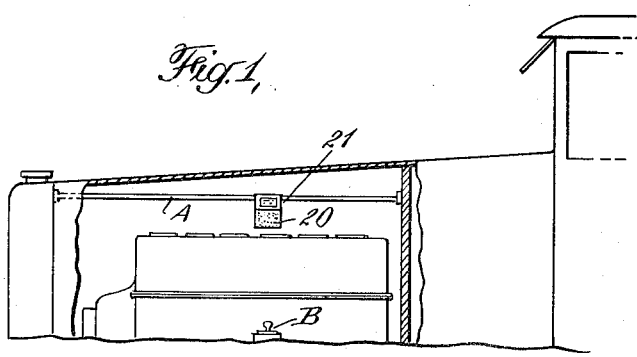
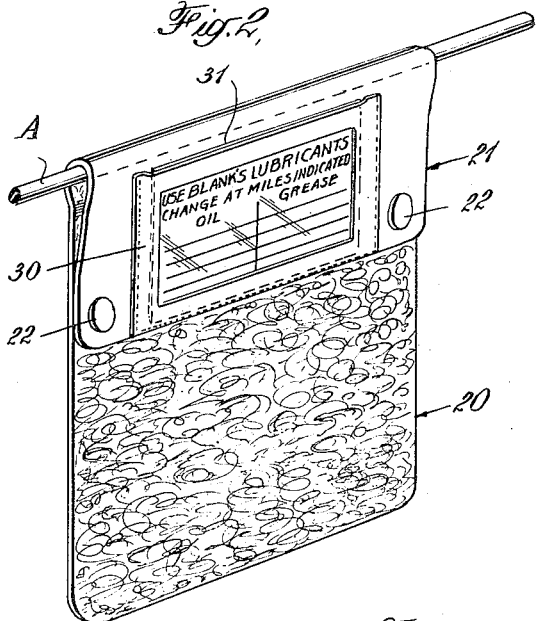
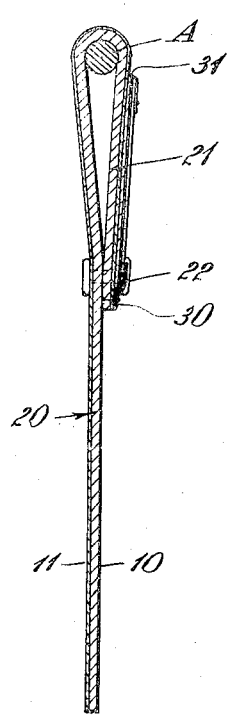
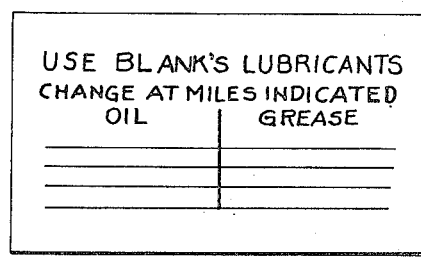
INVENTOR
Phillip R. Bragg,
BY
Marshall & Hawley
ATTORNEYS Patented Aug. 23, 1932

1,872,878

UNITED STATES PATENT OFFICE

PHILLIP R. BRAGG, OF NEPTUNE, NEW JERSEY

OIL GAUGE WIPER AND RECORD HOLDER

Application filed May 1, 1931. Serial No. 534,321.

This invention relates to improvements in oil gauge wipers and record holders.

Its object is to provide a simple, inexpensive device which is arranged to be supported upon a part of an automobile in a position conveniently located near the oil gauge of the motor, which device has a wiping surface and a pocket for holding a record card.

Other advantages of this invention will appear in the following specification in which I will describe the invention, the novel features of which will be set forth in appended claims.

Referring to the drawing,

Fig. 1 is a side elevation of a portion of an automobile with my device positioned thereon;

Fig. 2 is a perspective view of an embodiment of this invention;

Fig. 3 is a sectional side elevation of the upper portion of the device drawn to full scale; and Fig. 4 is an elevation of the record card.

The device is made of a sheet of absorbent material 10, such as felt, with a backing 11 of nonabsorbent material, such as water proofed or rubberized fabric. This is adapted to be folded over a radiator radius rod A of an automobile near the oil gauge B. When thus folded it forms a body portion 20 and a flap 21. Snap fasteners 22 are affixed to the flap near its corners with cooperating parts affixed to corresponding parts of the body.

30 is a frame affixed to the flap. It is open at the top for the insertion of a record card 31, but closed at its other three sides. This frame may be of tape sewed to the flap or of metal suitably attached.

The record card 31 is removable and replaceable. One of the advantages of the device is that the card may be used as an advertisement as it may bear upon it the name of the dealer in lubricants or the name of a supply station. As shown in Fig. 4, the words "change at miles indicated" and "Oil" and "Grease" are printed on the face of the card, together with ruled lines upon which may be written the mileage at which oil and grease has been supplied or at which oil and grease should be resupplied.

This record, placed as it is near the oil gauge, is in a place where it may be readily seen whenever the condition of the oil is to be inspected, and in a place which is not undesirably conspicuous at other times.

The felt surface 10 of the body 20 is also conveniently located near the oil gauge rod and is adapted to be used as a wiper for said rod, thereby furnishing a clean and suitable surface for wiping the rod, which is always available when needed. This obviates a common difficulty, as means for wiping the oil gauge rod are often unavailable when wanted and operatives are apt to pick up any rag or paper at hand which may contain dirt or grit, to use for this purpose. Furthermore, the backing for this wiping pad is of such a character as to prevent any oil which is wiped off of the rod onto the body from going through it and thus soiling the hands of the user.

What I claim is:—

1. An oil gauge wiper comprising a sheet of absorbent material having a non-absorbent backing, separable fasteners having parts located intermediate the upper and lower ends of said sheet, with cooperating parts adjacent the corners at one edge of said sheet, whereby said sheet may be folded over and secured about a supporting member, the spacing of said fasteners on the sheet from the said edge thereof being such, that when the sheet is folded, a free depending flap having an exposed absorbent face will extend beyond the folded section.

2. An oil gauge wiper comprising a sheet of absorbent material having a non-absorbent backing, separable fasteners having parts located intermediate the upper and lower ends of said sheet, with cooperating parts adjacent the corners at one edge of said sheet, whereby said sheet may be folded over and secured about a supporting member, the fasteners being so disposed as to secure the folded portion with the absorbent material inwardly of the fold, and the spacing of said fasteners on the sheet from the said edge thereof being such that when the sheet is folded, a free depending flap having an exposed absorbent face will extend beyond the folded section.

PHILLIP R. BRAGG.